Feb. 27, 1951    D. H. WAARA    2,543,212
FASTENER
Filed July 17, 1946

INVENTOR.
DAVID H WAARA
BY
ATTORNEY

Patented Feb. 27, 1951

2,543,212

UNITED STATES PATENT OFFICE 2,543,212

FASTENER

David H. Waara, Detroit, Mich., assignor to Robert L. Brown, Ferndale, Mich.

Application July 17, 1946, Serial No. 684,225

2 Claims. (Cl. 85—5)

This invention relates to a fastener and more particularly to a stamped sheet metal fastener for insertion in aligned openings where it is desired to secure parts together.

An object of the invention is to form a blank from sheet metal by stamping and then forming the blank into a tubular headed fastener.

Another object of the invention is to provide a toothed resilient portion extending axially of the fastener and projecting radially beyond the outer periphery of the fastener.

A further object of the invention is to close the opposite ends of the tubular fastener, the end for insertion into the opening being dome shaped and the opposite end being formed with a head portion.

Other objects and advantages of the invention will more fully appear from the following description taken in connection with the accompanying drawings, in which.

Figure 1:
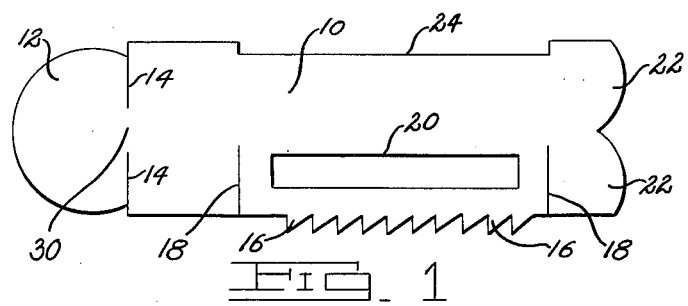
Fig. 1 is a top plan view of a blank from which the fastener is formed.

Referring to the drawings, I have shown a flat blank 10 stamped from sheet metal. The blank is of general rectangular shape having a rounded end portion 12 which is partially cut away from the main body portion of the blank by shearing as illustrated at 14.

A portion of the length of one longitudinal edge of the blank is provided with a plurality of teeth 16. This toothed portion is partially severed from the body of the blank by shearing at 18. Directly behind the teeth 16 and between the shearing 18 is a cut out portion 20. This cut out portion 20 together with the shearing 18 provides flexibility to the toothed edge relative to the body of the blank.

At the end of the blank, opposite to the rounded end portion 12, there are formed two, side by side, rounded portions 22 which are pressed to form the closed dome shaped end at the end of the fastener which is inserted in an opening. The edge of the blank, opposite to the toothed edge is cut out as indicated at 24 to permit flexing of the toothed portion 16 after the blank has been formed into its finished form.

Figure 2:
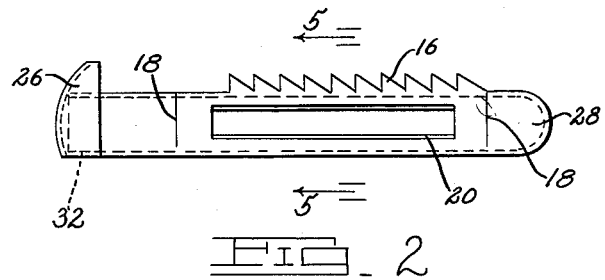
Fig. 2 is a side elevational view of the fastener after it has been formed.
Figure 3:
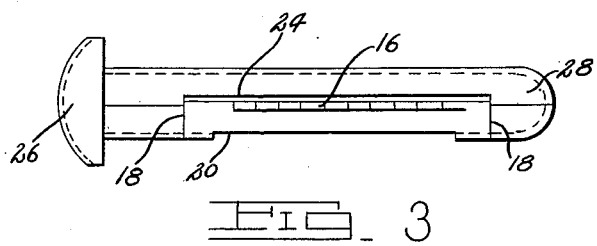
Fig. 3 is a view corresponding to Fig. 2 but taken at right angles thereto.
Figure 4:
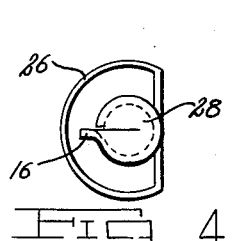
Fig. 4 is an end view of the fastener.
Figure 5:
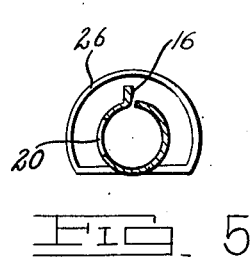
Fig. 5 is a sectional view taken on line 5—5 of Fig. 2.

The blank thus described is placed in suitable dies rolled into tubular form as indicated in Figs. 2 to 5 inclusive. The rounded portion 12 is formed into a dome shaped head 26 and the two rounded portions 22 are formed in the dome end 28 closing the end of the fastener and serving as a guide for inserting the fastener.

The toothed portion 16 is bent at right angles to the periphery of the tubular body portion so that at one side thereof the teeth project radially outwardly, and extend longitudinally thereof. The shearing 18 and cut out portion 20 permits flexing of the toothed portion as it is shoved in an opening. Since the toothed portion is flexible and there is a certain amount of resiliency in the metal, the teeth firmly engage the wall of an opening to retain the fastener in holding position.

Since the rounded end portion 12 is integrally joined to the body portion at 30, there is provided a flat side 32 on the head 26 which serves as an indication as to the location of the teeth and yet permits the fastener to be inserted in an opening in close proximity to a vertically projecting ledge of wall above the upper surface of the opening.

The device has been illustrated in a preferred embodiment of the invention but it will be understood that various changes including the size, shape and arrangement of parts may be made without departing from the spirit of my invention and it is not my intention to limit its scope other than by the terms of the appended claims.

I claim:

1. A sheet metal fastener comprising a tubular body portion having its side wall split longitudinally, a plurality of radially extending teeth carried by one of the edges formed by the split, a longitudinally extending portion having a cut out portion adjacent the inner edge of the row of teeth for imparting flexibility to that edge carrying the teeth, and a head on said body portion.

2. A sheet metal fastener comprising a tubular body portion having its side wall split longitudinally, a plurality of radially extending teeth carried by one of the edges formed by the split, a longitudinally extending portion having a cut out portion adjacent the inner edge of the row of teeth and circumferentially extending cuts at the opposite ends of the row of said teeth for imparting flexibility to that edge carrying the teeth, and a head on said body portion.

DAVID H. WAARA.

REFERENCES CITED

The following references are of record in the file of this patent:

UNITED STATES PATENTS

| Number | Name | Date |
|---|---|---|
| 727,111 | Duffy | May 5, 1903 |
| 1,070,265 | Kokernot | Aug. 13, 1913 |
| 2,006,813 | Norwood | July 2, 1935 |
| 2,110,959 | Lombard | Mar. 15, 1938 |
| 2,244,975 | Tinnerman | June 10, 1941 |
| 2,314,770 | Cogswell | Mar. 23, 1943 |
| 2,391,298 | Davis | Dec. 18, 1945 |